July 22, 1941.  O. W. JOHNSON  2,250,161

MACHINE LATHE

Filed Nov. 25, 1939

OTTO W. JOHNSON
INVENTOR.

BY
ATTORNEY.

Patented July 22, 1941

2,250,161

UNITED STATES PATENT OFFICE 2,250,161

MACHINE LATHE

Otto W. Johnson, Oakland, Calif.

Application November 25, 1939, Serial No. 306,163

16 Claims. (Cl. 82—12)

This invention relates to machine lathe attachments, and more particularly to such devices facilitative of machining parts to have truly spherical, concave and convex, surfaces, and to have various machining operations of other types performed with geometrical precision, in such manner that absolute accuracy, and uniformity of the parts, is achieved with maximum efficiency on the part of the operator.

Figure 1:
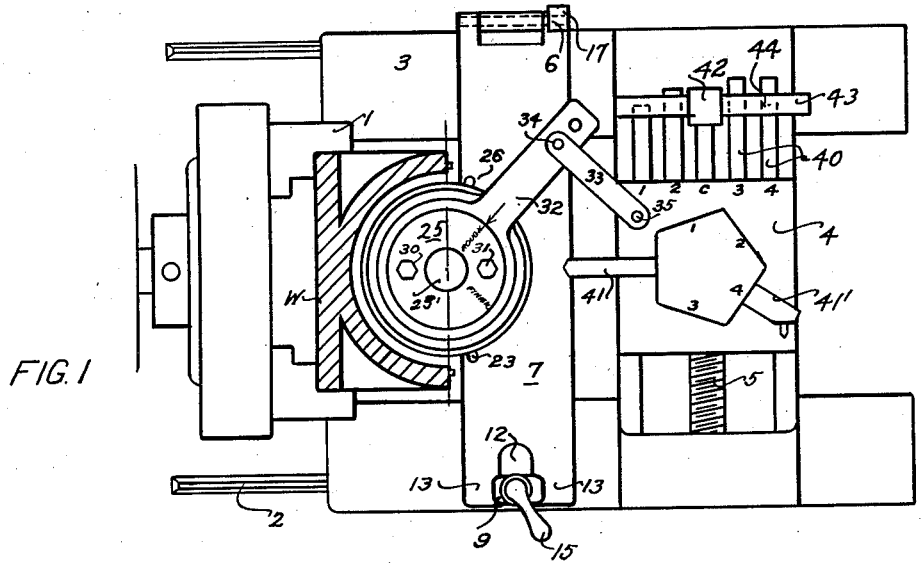
Figure 1 is a fragmentary plan view of a lathe with a work piece in section.

In the drawing the work W, a casting to be machined spherically concave, is mounted in the chuck 1 of a lathe having carriage ways 2 and carriage 3 provided with cross-slide 4 and cross-slide-feed 5.

Figure 3:
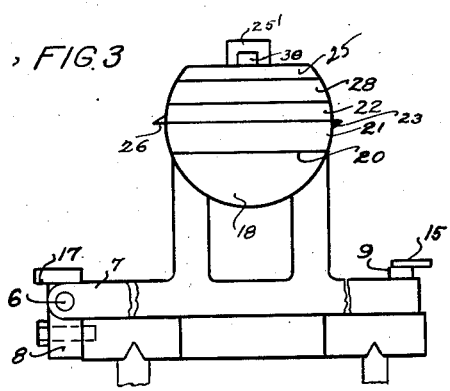
Figure 3 is a fragmentary elevational view.

On the carriage 3, intermediate the work and the cross slide 4, there is mounted for rotation on longitudinal pivot pin 6, the normally horizontally secured bar 7. Pin 6 is mounted in bracket 8 rigidly secured to the carriage as by bolts 9. As shown in Figure 3, the bottom of bar 7 and the juxtaposed top surface portion of the carriage are machined flat to contact, and the pin 6 is so disposed as to assure this disposition.

The forward end of the bar 7 is, when spherical surfaces are to be machined, clamped to the position shown, by a plate 9 rotatable about the clamping bolt 10 and suppolted by the spring 11, the bolt and spring passing through the end rotch 12 in the bar 7 to position the clamp plate 9 above the projections 13 between the spring and the hub 14 of crank 15. A pin 16 secured to the crank arm provides for engagement of the plate 9 by the crank arm after the bolt has been loosened to cause rotation of the plate so as to permit the projections 13 to move upwardly incident to moving the bar into clearing position, vertically around pivot 6 to a point where the lug 17 engages bracket 8 (Figure 3).

Secured to the bar 7 is a chuckwardly disposed tool holder bracket 18 secured to which is a pin bearing 19, preferably of conical taper, having its axis disposed to intersect the lathe axis at right angles, and preferably to be accurately vertically disposed to effect such intersection. Taper pin 19 is preferably rigidly secured to the lug 18, as shown, the taper convergence being upward.

The lug 18 is flattened on the upper surface 20 and received thereon to taper fit pin 19, is a built up segment of spherical shape comprising a pair of disk like plates 21 and 22 internally tapered to fit the pin 19. The lower plate has disposed therein a tool slot 23 opening upwardly and a tool is secured in said slot to have its cutting edge lie in the horizontal plane including the lathe axis. The tool is held in the slot by the upper plate, and is adjustable radially by a vertical screw 24 mounted in the upper plate, accessible only by removal of friction cover plate 25.

The upper plate 22 is provided with a similar tool slot for accommodation of a cutter at 26, the latter being disposed with its cutting edge directed oppositely from that of the tool 23, since the tools take effect at opposite sides of the lathe axis. A screw similar to 24 is employed for the adjustment of tool 26.

Suitable countersunk screws, not illustrated, serve to unify the plate 21 and 22 and the segment is snugly held on pin 19 by nuts 27 and a suitable fiber washer.

Plate 22 is provided with a central boss 28 slightly tapered, upwardly convergent, to receive therearound the actuator arm ring 29 likewise internally tapered to fit the boss. Ring 29 is releasably secured for actuation of the plates around 19, by a friction cover plate 25 fastened to hub 28 by cap screws 30 and 31.

The bottom of plate 31 is generally flat to the right of screw 30, as seen in the figures, but leftwardly of the right side of screw 30 a slight thickness of the metal is removed. The rightward portion of the plate 25 is clamped firmly down by screw 31 when ring 29 is secured to hub 28 to move the same. Screw 30 is tightened after 31 in the initial adjustment. Thereafter, in order to release ring 29 for readjustment of the arm 32 around hub 28, it is only necessary to unscrew screw 31 slightly, which permits clamping plate 25 to pivot slightly near screw 30.

Plate 25 provides an upward cup portion 25' for coverage of the access ports to 24 and the spindle 19, to insure freedom from chips and the like.

It will be apparent from Figure 1 that more than half, the chuckward half, of the toolholder assembly, is generally spherical in shape and of only slightly less diameter than the diameter of the surface S to be worked upon. In this way a very rigid, non-vibratory, tool is insured, a matter of extreme necessity for the best accuracy.

It is desirable to give a rough and a finish cut to the surface, provided spherical coincidence of the tool axis with the spherical axis of the surface in both the rough and finish operations is assured. It is for this reason that tool 23, the rough cutting tool, is first used, and then tool 26, the finish tool, is used. Between these operations, the spindle axis 19 is maintained without disturbance. The sequence is as follows: From the position in Figure 1, the tool 23 is moved clockwise inward to the lathe axis, the tool 26 merely following and remaining outside the workpiece. The tool 23 is then returned to its Figure 1 position and now the tool 26 is rotated counterclockwise to take the finishing cut.

It is clear that the tools 23 and 26 should be both placed slightly tailstockwardly on the pin axis 19, as illustrated, in order that one be in operative position very nearly after the other has completed its withdrawal, and so that a quarter revolution does not cause both cutters to engage the work.

The arm 32 is preferably machine driven, and to this end the cross slide 4 is power driven, and is linked to the arm 32 by a link 33 which is readily removable from pivot pins 34 and 35.

After the roughing cut has been taken by tool 23 and position resumed as shown, clamp screw 31 is released and slide 4 is retracted so that arm 32 occupies the position indicated as the Finish position, the tool 26 remaining in position indicated. Screw 31 is again tightened and the slide 4 moved to cause 26 to take the finishing cut. The adjustability of the arm 32 provides for more than 180° of tool post rotation, with only a limited movement of the slide 4 in reciprocation. Other, more intricate, mechanisms might be employed for actuating the tool post.

After finishing, the work W is ready for facing cuts, or other machining, such as a diametral bore, a flange formation, or any combination of the foregoing.

In order to effect these operations accurately and economically, the work remains in the chuck, link 33 is removed, and the carriage 3 is retracted to withdraw the axis of 19 from coincidence with the vertical axis of the work and to clear the tools and holder from the work.

Clamp 15 is now released, and bar 7 is rotated to a position vertically above 6 so as to clear the work of the spherical working tools, in which position it rests against stop 17.

After the work piece W has been completed, withdrawn, and a fresh piece inserted, the bar 7 is replaced as shown, where the tools 23 and 26 are in exactly the required relation as before, it being only necessary to move the carriage 3 to the longitudinal stop 36 corresponding to the longitudinal reference point from which all cuts are taken.

The cutting radii of tools 23 and 26 are determined by reference to the diametrally opposed points of the spherical surfaces of plates 22 and 21 respectively, the major diameters of which are known and measureable directly.

Figure 4:
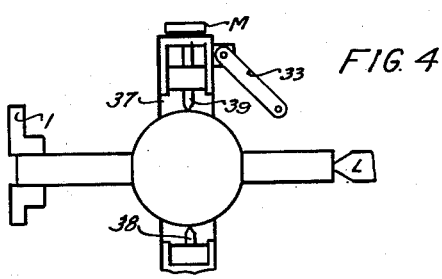
Figure 4 is a fragmentary plan view of another attachment.

In order to cut a convex spherical surface, the post and lug 18 are omitted, and the bar 7 pivotally supports a U-shaped tool holder 37, shown, in plan only, in Figure 4, having cutters disposed at opposite sides of the lathe axis 1, rotatable in a plane including said axis, preferably horizontal, and actuated by link 33 as before. Cutters 38 and 39 are preferably slide mounted and referred to axis 1 by suitable indexing means, as by micrometer adjustments at M.

It will be noted that one pass of the cutters permits the entire spherical surface to be cut, since the cutters work simultaneously on right and left halves of the piece.

Figure 2:
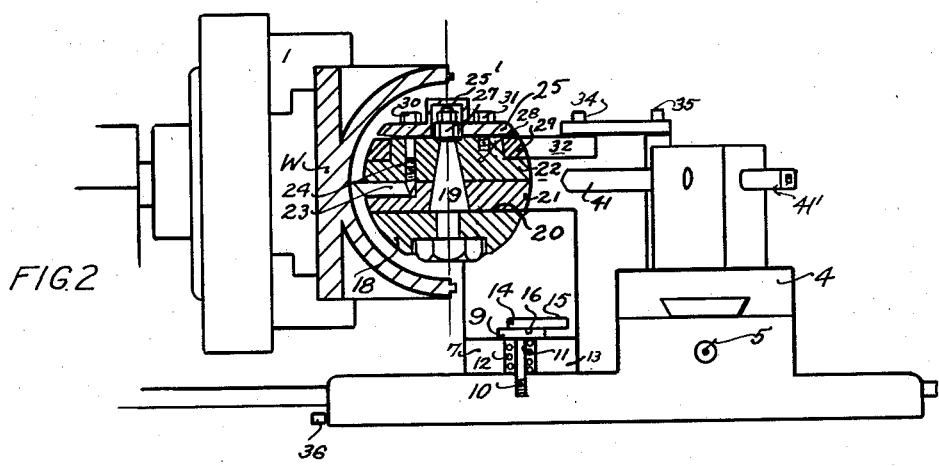
Figure 2 is a similar view in elevation, showing parts in section.

The spherical work of Figures 1, 2, and 3 having been completed, the remaining operations may best be achieved by a turret head mounted on the slider, 4, the cross positions of the head for the various tools being determined by an array of stop pins 40 of selected lengths governed by the lateral position requirements of the tools 41. All stop pins are set up before a production run. For example, pin 40C corresponds to lathe center drilling. Pin 40C is shown to have been stopped by the selector slide stop 42, slidable on rail 43 to a position for stopping any one of the pins 40. Pins 40 are replaceable by pins of other lengths so that the lateral position of the respective tools is made flexible. Markings of pins 40 correspond to the tools selected for the work.

I claim:

1. In combination with a machine lathe having a horizontal axis, a chuck, and a longitudinally adjustable tool carriage; a bar on said carriage, means pivoting said bar laterally of the lathe axis, means for clamping said bar to said carriage, a tool holder pivoted on said bar, a cross slide on said carriage, and a quick detachable link between said carriage and said tool holder for actuating said tool holder about its pivot in response to movement of said cross slide.

2. In combination with a machine lathe having a horizontal axis, a chuck, and a longitudinally adjustable tool carriage; a bar on said carriage, means pivoting said bar laterally of the lathe axis, means for clamping said bar to said carriage, a tool holder pivoted on said bar, an actuator arm frictionally secureable to said tool holder for angular adjustment with respect thereto, and cutting tools on said holder for use in accordance with the angular adjustment of said arm.

3. In combination with a machine lathe having a horizontal axis, a chuck, a longitudinally adjustable tool carriage, means for cutting a spherical surface carried by said carriage and adjustable into and out of oriented cutting relation with respect to said chuck, a cross slide on said carriage, a turret on said cross slide, means for detachably connecting the spherical cutting means for actuation by said cross slide, an array of cross-slide stops, a selector for said stops to arrest the cross slide in proper position for the turret tool operating, and means for removing said spherical cutting tool from the path of the turret tools without disturbing the workpiece.

4. In combination with a machine lathe having a horizontal axis, a chuck, and a longitudinally adjustable tool carriage, a bar on said carriage, a tool holder on said bar pivoted to permit rottion of the tool edge in a plane inclusive of the chuck axis and about a line through said axis at right angles to said plane, and cutting tools on said tool holder, said cutting tools being disposed angularly apart about said line by angles greater than the angle through which the first used tools must move in making a cut.

5. In combination with a machine lathe having a horizontal axis, a chuck, and a longitudinally adjustable tool carriage, a bar on said carriage, a tool holder on said bar pivoted to permit rotation of the tool edge in a plane inclusive of the chuck axis and about a line through said axis at right angles to said plane, a plurality of cutting tools on said tool holder, an actuator arm pivoted on the axis of said tool holder and angularly adjustable and securable with respect to the tools on said holder whereby to select the tool to be used, a cross slide on said carriage, and a link for actuation of the tools by the slide.

6. In combination with a machine lathe having a horizontal axis, a chuck, and a longitudinally adjustable tool carriage; a bar on said carriage, means pivoting said bar laterally of the lathe axis, a generally spherical tool holder carried by said bar having a rotary tool holder segment pivoted about a fixed axis of said holder, and means for clamping said bar so that the tool edge moves in a plane inclusive of the lathe axis, and about a line through said axis at right angles to said plane.

7. In combination with a machine lathe having a horizontal axis, a chuck, and a longitudinally adjustable tool carriage; a bar on said carriage, means pivoting said bar laterally of the lathe axis, means for clamping said bar to said carriage, a lug secured to said bar disposed chuckwardly from said bar, and a tool holder on said bar pivoted to permit rotation of the tool edge in a plane inclusive of the chuck axis and about a line through said axis at right angles to said plane and through the axis of the lathe.

8. In combination with a machine lathe having a horizontal axis, a chuck, and a longitudinally adjustable tool carriage, a bar on said carriage, a tool holder on said bar pivoted to permit rotation of the tool edge in a plane inclusive of the chuck axis and about a line through said axis at right angles to said plane, and cutting tools on said tool holder, said cutting tools being disposed angularly apart about said line by angles greater than the angle through which the used tool must move in making a cut.

9. In combination in a machine lathe having a horizontal axis, a chuck, and a longitudinally adjustable tool carriage; a turret tool-head rotatably mounted on said carriage; a spherical-surface-turning tool, adapted to turn a spherical surface on work mounted in said chuck and turned by said chuck, mounted on said turret carriage; and means for bodily moving said spherical-surface-turning tool away from its operative position on said carriage to permit operation on the work by the remaining tools.

10. In a machine tool having a chuck and tool carriage; a multiple-operation tool head mounted on said carriage; a second tool head mounted on said carriage for movement into and out of a position between the first mentioned tool-head and the chuck.

11. In combination in a machine lathe having a horizontal axis, a chuck, and a longitudinally adjustable tool carriage; a tool turret head mounted on said carriage, and a tool mounted for movement into and out of a position between the turret tool-head and the chuck whereby to operate on work in said chuck while in said position and permitting access of the other tools to the work when out of said position; and means for rotating the tool and moving the turret head concurrently.

12. In a machine lathe, means for holding and rotating work about a fixed axis, a tool holder mounted adjacent said axis and rotatable about an intersecting axis at right angles to said first axis, and tools on said holder working on both axis-sides.

13. In a machine tool, means for holding and rotating work about a fixed axis, a carriage slidably mounted on said machine along the fixed axis of the machine, a cross slide carriage on said first carriage, a turret tool head on said cross carriage; a tool holder with tools for cutting a spherical surface, said tool holder being pivotally mounted to rotate in either direction, said tools in said tool holder being positioned to cut a spherical surface from either side of said fixed axis, actuating means for said pivotally mounted tool holder, and means for withdrawing the spherical cutting tools to permit use of the other tools.

14. In a machine tool, means for holding and rotating work about a fixed axis, a carriage slidably mounted on said machine along the fixed axis of the machine, a cross slide carriage on said first carriage, a turret tool head on said cross carriage; pivotally mounted cutting tools on said carriage for cutting a spherical surface on said work, and means for withdrawing the spherical cutting tools to permit use of the other tools.

15. In a machine lathe, means for holding and rotating work about a fixed axis, a tool carriage mounted on the lathe bed for movement along said lathe axis, a tool holder mounted on said carriage adjacent said axis of rotation for rotation about an axis at right angles to and intersecting the fixed axis of rotation of said work and adapted to turn a continuous spherical surface through a solid angle greater than 180° on the work.

16. In a machine lathe, means for holding and rotating work about a fixed axis, a tool carriage mounted on the lathe bed for movement along said lathe axis, a tool holder head projecting chuckwardly from said carriage, the portion of the tool holder projecting toward the chuck being spherical through a solid angle in excess of 180°, said tool holder being adapted to position a cutting tool edge in the equatorial plane of said spherical holder whereby the tool holder projects at all points a less distance from the spherical cutting center of the holder than the tool edge.

OTTO W. JOHNSON.